Figure 1:
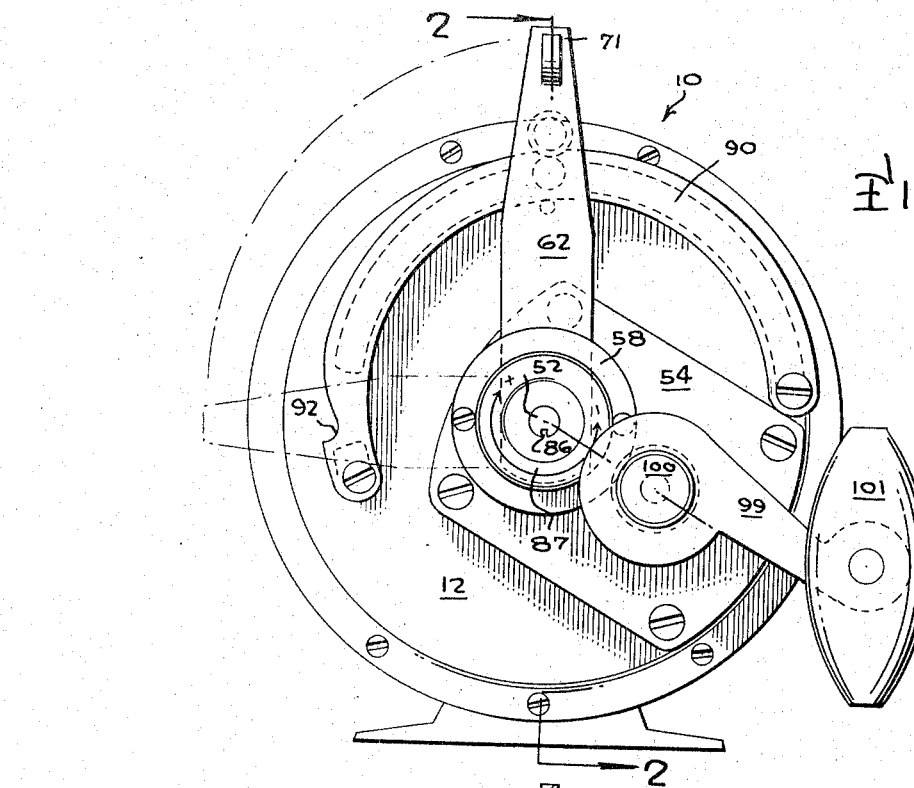

April 25, 1967

F. M. GRIETEN 3,315,913

DRAG MECHANISM FOR A FISHING REEL

Filed July 9, 1964

3 Sheets-Sheet 1

INVENTOR
FRED M. GRIETEN
BY
Mason, Fenwick & Lawrence
ATTORNEYS

April 25, 1967   F. M. GRIETEN   3,315,913
DRAG MECHANISM FOR A FISHING REEL
Filed July 9, 1964   3 Sheets-Sheet 2
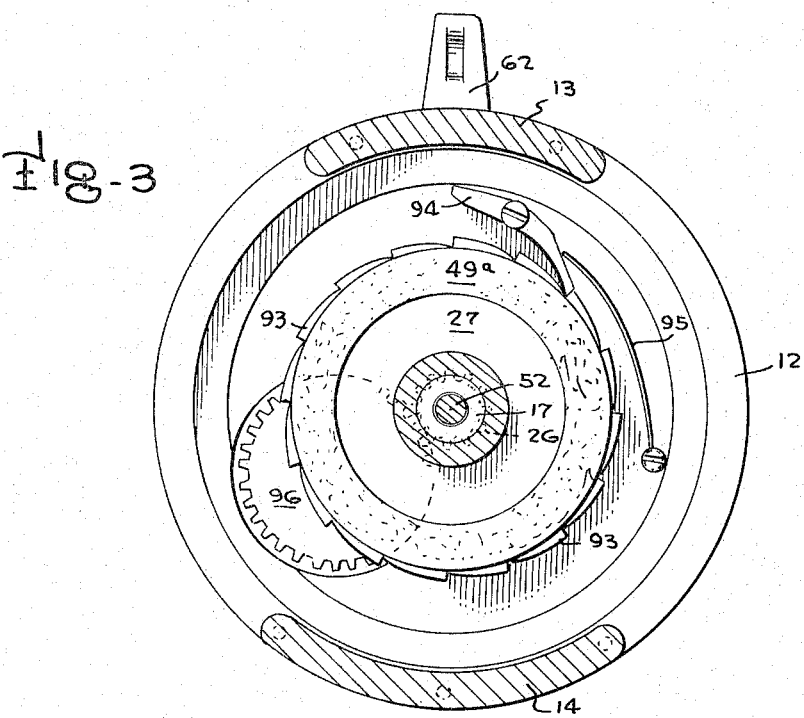
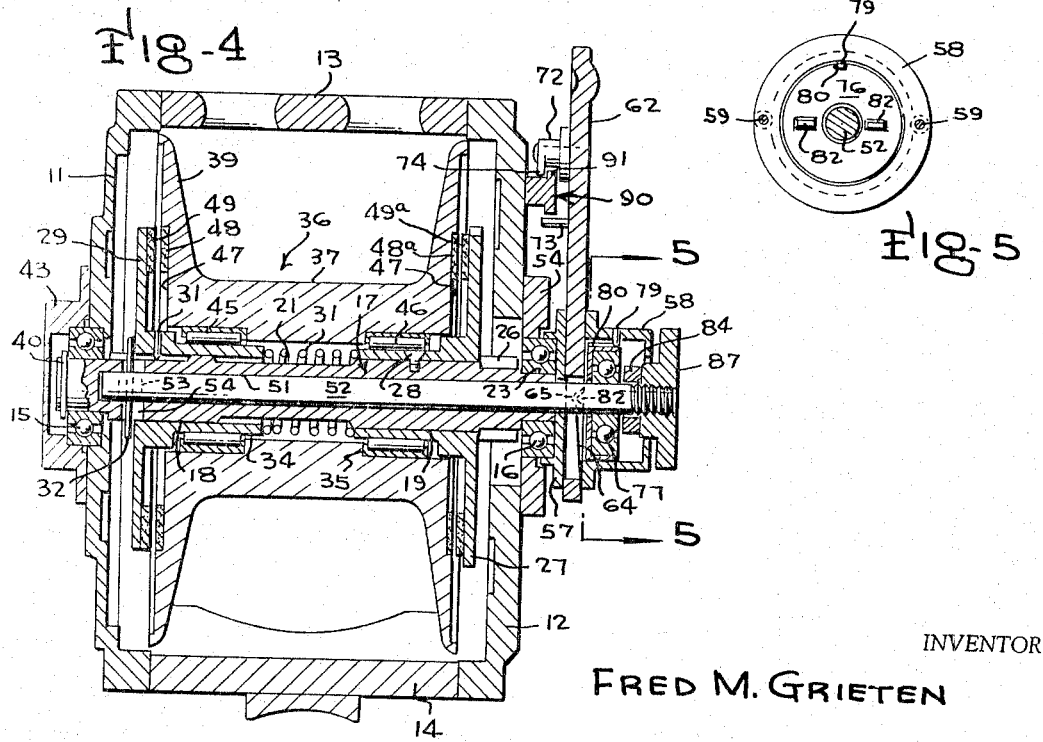
INVENTOR
FRED M. GRIETEN
BY Mason, Fenwick & Lawrence
ATTORNEYS April 25, 1967 F. M. GRIETEN 3,315,913
DRAG MECHANISM FOR A FISHING REEL
Filed July 9, 1964 3 Sheets-Sheet 3

INVENTOR
FRED M. GRIETEN
BY
Mason, Fenwick & Lawrence
ATTORNEYS

United States Patent Office 3,315,913
Patented Apr. 25, 1967

3,315,913
DRAG MECHANISM FOR A FISHING REEL
Fred M. Griefen, Suwannee, Fla.
(1533 Normandy Way, Leesburg, Fla. 32748)
Filed July 9, 1964, Ser. No. 381,302
3 Claims. (Cl. 242—84.45)

The present invention relates to brakes in general and more particularly to a brake and drag mechanism for fishing reels that is insensitive to changes in temperature developed during braking action so that positive braking may be had upon the line spool.

Because of the very critical distance between the braking elements of fishing reels any change in this distance will have a detrimental effect upon the way the line is paid out or reeled in. If the fisherman has set the brake or drag tension for a specific value and then, because of this constant drag, heat is generated and transmitted to the surrounding frame of the reel, the metal parts of the reel will obviously tend to change size due to expansion and this will, therefore, vary the amount of drag that has been previously pre-set and will necessitate constant attention of the fisherman to the braking mechanism. Then when the reel is not operated for a relatively short period of time it will cool off and cause the various members of the reel to return to normal size thereby again changing the critical distance between the braking surfaces. The above noted problems may be eliminated by confining the heat transfer to only the braking surface supports and then by interconnecting the supports within the central portion of the reel to confine the heat transfer thereto and by refraining from using the frame to provide a pressure surface for the braking elements.

Further, in the most commonly used reels a so-called "star drag" is used by which the proper brake tension is applied by turning an external nut of a star shape to adjust the distance between the braking surfaces. Such a type of adjustment is inconvenient in use and is generally unsatisfactory. It is known that a combination type of braking system that combines the features of a "star drag" and yet has a finger tip control lever arm braking system is desirable.

Therefore, an object of this invention is the provision of a new and improved fishing reel in which the braking is done within the central core of the reel and does not inter-react with the end plates or frame of the reel.

Another object of this invention is the provision of an improved braking mechanism in which all of the braking surfaces are interconnected to confine heat losses thereto and to permit smooth braking action.

A further object is the provision of a structure for fishing reels to vary the clutching pressure of the members and by controlling the clutching action control the degree of braking applied to the device.

Another object of this invention is the provision of a combination thumb-screw and lever actuated adjustable drag mechanism to operatively engage the braking surfaces.

A still further object of this invention is the provision of a fishing reel in which a finger tip lever control positively adjusts the braking tension to a desired value in order to prevent over-running of a spool which consequently allows a line tangle to develop and yet providing means allowing the lever to be shifted to a position which allows free running of the line spool.

Other objects, advantages and capabilities of the invention will become apparent from the following description, taken in conjunction with the accompanying drawings showing only a preferred embodiment of the invention.

Figure 2:
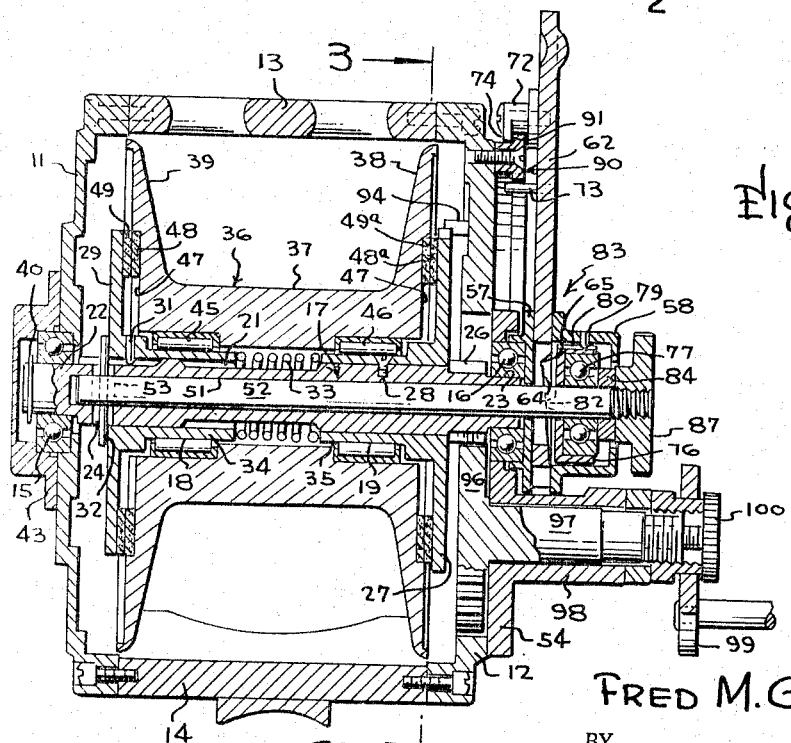
Figure 6:
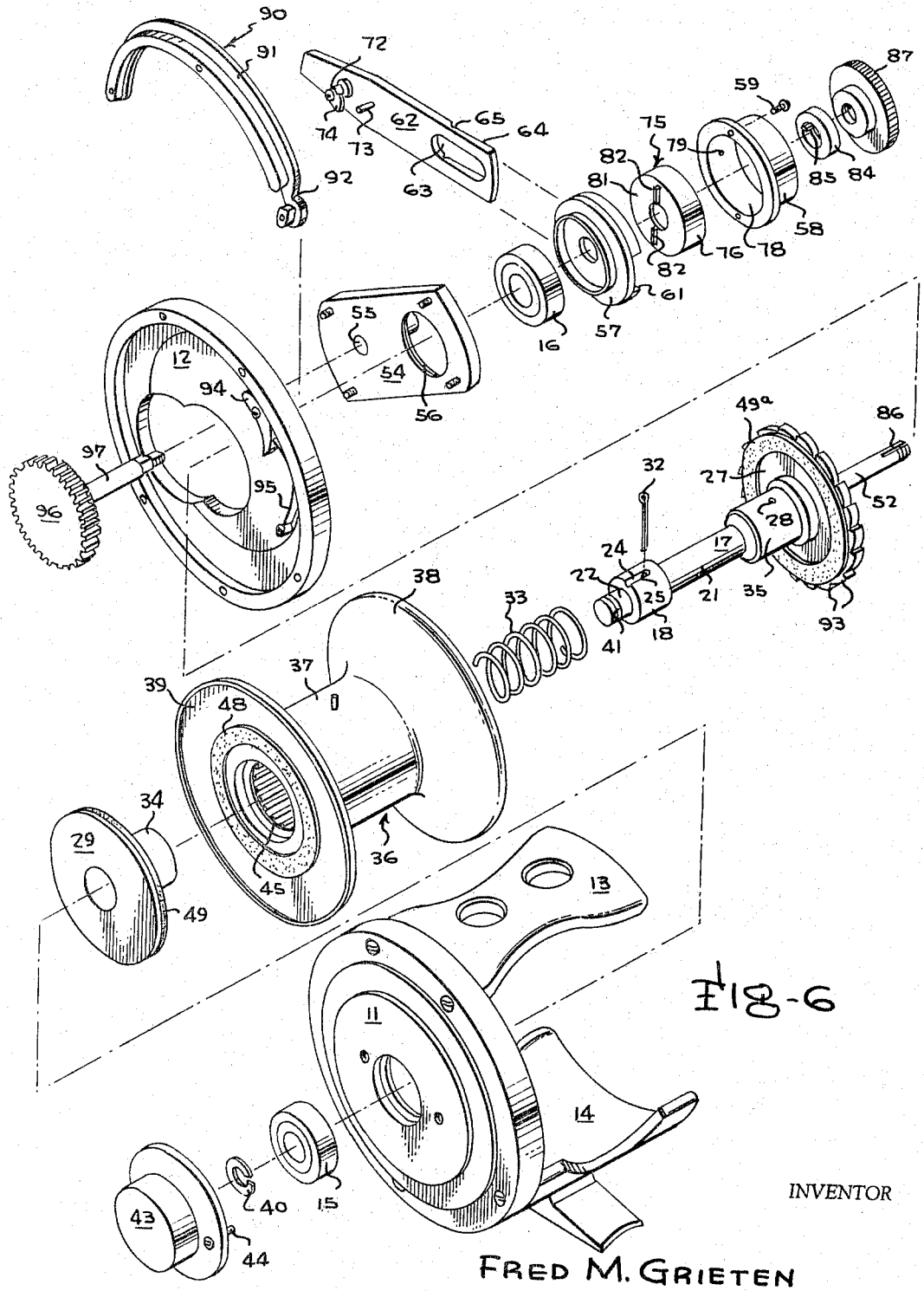

In the drawings:
FIGURE 1 is a side elevation view of the fishing reel of the present invention showing specifically the arcuate and radial movements of the brake actuating lever arm;
FIGURE 2 is a vertical section through the structure taken on lines 2—2 of FIGURE 1 showing the spool in brake applying condition;
FIGURE 3 is another vertical section of the reel taken along lines 3—3 of FIGURE 2;
FIGURE 4 is a vertical section view similar to that of FIGURE 2 showing the spool in a brake released free spooling condition;
FIGURE 5 is a vertical section through the structure taken along lines 5—5 of FIGURE 4 showing a portion of the camming surfaces associated with the lever arm; and
FIGURE 6 is an exploded perspective view of the fishing reel.

Referring to the drawings wherein like reference numerals designate corresponding parts throughout the several figures, there is shown a fishing reel 10 in which the improved brake structure is located. The reel comprises a fixed frame which includes end plates 11 and 12 held in spaced relation by means of frame spacers 13, 14. The end plates carry central bearings 15, 16 which journal a through shaft 17. The shaft 17 comprises clutch plate support surfaces 18 and 19, a central shaft area 21 and bearing support surfaces 22, 23. Longitudinally located within support surface 18 is a spline 24 in which there is located an elongated aperture 25 which projects transversely through the shaft and passing through the center line thereof. Integrally mounted upon the shaft 17 and adjacent support 19 is gear member 26 which is adapted to impart rotation to the shaft 17.

Mounted upon the shaft 17 and more particularly upon support surface 19 is clutch plate 27 which is affixed to the support surface by set screw 28 in such a manner that the clutch plate 27 is juxtaposed with gear 26. At the other end of the shaft 17 and upon support surface 18 is a slidable clutch plate 29 limited in sliding movement only by the amount of travel possible by key 31 moving in spline 24. For operatively retaining clutch plate 29 upon the shaft 17 there is provided within the elongated aperture 25 a keeper pin 32 which is adapted for movement within the elongated aperture. To retain the clutch plates 27 and 29 in proper spaced relation a compression spring 33 is placed about central shaft portion 21 to bear against spool bearing surfaces 34, 35. In addition to retaining the clutch plates in spaced apart relation the spring 33 also retains clutch plate 29 firmly against keeper pin 32. Shaft 17 terminates within end plate 11 by being rotatably supported by bearing surface 22 within bearing 15 and is held against excessive axial movement by shoulder 42 of support surface 18 and by snap ring 40, which is fitted about the shaft in ring retaining slot 41. Covering the end of end plate 11 and preventing foreign matter from entering the moving parts of the reel is bearing cover cap 43 fastened to the end plate 11 by suitable fasteners 44.

A spool 36 having a usual cylindrical line receiving central section 37 and end flanges 38, 39 is adapted to be mounted for rotation between clutch plates 27 and 29. To support the spool for rotative movement there is provided within the central recess thereof needle bearings 45, 46 which engage spool bearing surfaces 34, 35 respectively. Mounted within the recesses 47 are matching brake rings 48 and 48a composed of any suitable and well known brake lining, and mounted upon the inner peripheral surfaces of clutch plates 27 and 29 and adapted to operatively co-act with brake rings 48, 48a to retard the movement of the spool are suitable friction rings 49 and 49a.

Resting within the central longitudinal recess 51 of shaft 17 is brake control draw bar 52 which is adapted for axially reciprocative movement within shaft 17 wherein one end of the draw bar terminates within recess 51 while the other end terminates exterior of the shaft 17. In the end of the draw bar 52 which terminates within the shaft 17 there is located a transverse elongated aperture 53 which accepts keeper pin 32 when both elongated apertures 24 and 53 are in registry. It can easily be seen that at such time as an axial force is applied to draw bar 52 to move it in a direction out of shaft 17, the draw bar 52 will carry with it pin 32 and slidable clutch plate 29 which then positions clutch plate friction ring 49 in juxtaposition with brake ring 48 and upon continued movement spring 33 compresses as the clutch plate 29 moves in an axial direction and presses against the spring. Since the needle bearings 45, 46 are freely mounted upon bearing surfaces 34 and 35, the spool 36 will move in an axial direction upon continued movement of draw bar 52 until brake ring 48a comes into contact with friction ring 49a. At this time full braking is being applied to both sides of the spool 36 and since clutch plate 27 is fixedly positioned against movement, the movement of the draw bar 52, spool 36 and clutch plate 29 is halted. This also prevents spool 36 from revolving about bearings 45, 46.

In order to apply the necessary axially reciprocative movement to the draw bar 52 there is mounted upon end plate 12 the necessary structure for such a purpose which includes a crank shaft support housing 54 having a crank shaft aperture 55 with a recess 56 to house the shaft bearing 16. Positioned upon support housing 54 and covering shaft bearing 16 and coaxial therewith is a lever arm guide 57 upon which is affixed a lever arm guide cover 58 by fasteners 59. Lever arm guide 57 has a deeply notched transverse guide slot 61 into which there is mounted a complementary substantially flat lever arm 62 adapted for movement within the slot 61. The lever arm has in one end thereof a draw bar aperture 63 through which the draw bar 52 projects when in operative relation. At the end of the lever arm 62 in which is located aperture 63, the flat planar surface of one side of the lever arm is angularly cut to provide an inclined cam surface 64 which slopes to an under cut relief notch 65 and terminates at this point. At the other end of the lever arm, and noted by the numeral 71, there is positioned on the side opposite the cam surface 64 a pair of follower pins 72, 73. Follower pin 72 projects perpendicularly from the lever arm 62 and terminates in a lip 74 which projects generally parallel to the longitudinal axis of the lever arm and in a direction toward the draw bar aperture 63. The follower pin 73 is merely an elongated dowel projecting perpendicularly from the lever arm.

The side of the lever arm opposite the inclined cam surface 64 is positioned within the slot 61, at which time the lever arm guide cover 58 containing the integral cam surface and draw bar bearing 75 is positioned over the lever arm guide 57. The cam surface and draw bar bearing 75 is a combination piece comprising a hollow cylindrical shaped cam surface member 76 and a bearing member 77 which is frictionally fitted within the hollow cylindrical portion of the cam member 76. The combination cam surface and draw bar bearing 75 is fitted within the opening 78 of lever arm guide cover 58 and prevented from rotation therein by inter-fitting the keyway 79 of the guide cover and the spline 80 of cam surface member 76. Upon the flat surface 81 of cam surface member 76 there projects therefrom cam surface 82 adapted to rest upon the inclined cam surface 64 of the lever arm.

To maintain the lever arm assembly, generally indicated by numeral 83, in operative relation against support housing 54 a safety washer 84 having a keyway 85 is fitted about the free end of draw bar 52 and prevented from free rotation by inter-fitting the keyway 85 and the draw bar spline 86. Thumb screw 87 is then positioned about the threaded end of the draw bar to maintain close contact of the various portions of the lever arm assembly 83 and to act as one means of axially reciprocating the draw bar to the braking and nonbraking positions.

Mounted upon the outside face of end plate 12 is an arcuate lever arm cam 90 which comprises generally an arc somewhat greater than 180°, however, it should be noted that the amount of arc may be more or less depending upon the particular size or design of the present fishing reel. The lever arm cam 90 comprises an over hanging lip 91 about the outer peripheral surface of the cam, wherein one end of the lip 91 is deeply notched as indicated by numeral 92 to provide for a free spool position. As can be noted from FIGURE 1 the lever arm cam 90 is mounted upon the end plate 12 in such a manner that the geometric center of the arcuate lever arm cam 91 is positioned off center with respect to the center line axis of draw bar 52. Follower pin 72 engages the cam 90 in such a manner that the follower pin lip 74 projects under lever arm cam lip 91 so that upon movement of the lever arm about the periphery of the cam the lever arm has both a circular and radial motion when related to the axis of draw bar 52. The follower pin 73 lies adjacent the interior periphery of the lever arm cam 90 to provide a smooth functioning movement of the lever arm about the lever arm cam.

In the present fishing reel the drive for the spool 36 is through the clutch plates 27 and 29, and, therefore, through the braking mechanism. The clutch plate 27 is provided with the usual ratchet teeth 93, and there is a cooperating pawl 94 mounted upon the interior surface of end plate 12 and pivoted thereto. The pawl engages the ratchet teeth 93 due to the bias of spring 95 and thereby prevents reverse rotation of the clutch plates. In order to drive the spool 36 the driving gear 96 meshes with gear member 26 to impart rotation thereto. Driving gear 96 has a crank shaft 97 projecting through end plate 12 and through crank shaft housing 98 wherein a crank arm 99 is affixed thereto by a suitable screw 100. Handle 101 provides a gripping member for the operator of the reel so that rotational motion may be imparted to the crank arm 99 and thence to the driving gear 96.

In operation it is obvious that to reel in the fishing line about spool 36 the friction rings 48, 49 and 48a, 49a must be in contact in order that the driven input through gears 96 and 26 will be imparted to central shaft 17 and thence to the spool 36, however, the degree of frictional engagement between the brake friction rings and the clutch friction rings may be varied so as to provide a degree of engagement therebetween which span the ranges between a complete absence of relative movement to a range of high relative movement. In order to apply braking or drag to the present reel it is merely necessary to rotate thumb screw 87 in a clockwise manner which, as may be seen in FIGURE 2, will force the projecting cam surfaces 82 against the incline cam surface 64 of the lever arm 62 and at the same time tend to draw the draw bar 52 in an axial manner to the exterior of the fishing reel. Since the cam surfaces 82 and 64 are now fixedly engaged the draw bar 52 will move axially carrying with it clutch plate 29 by the action of keeper pin 32 which rests against the rear surface of the clutch plate. The initial movement of drawbar 52 will move clutch plate 29 in such a manner as to decrease the gap between friction rings 48 and 49 to a point where these surfaces engage and thereafter continued movement of the thumb screw 87 will compress spring 33 and will move spool 36 a slight distance axially to engage the friction rings 48a, 49a. At this point, depending upon the degree of frictional engagement between the friction rings, the reel may or may not be in full braking engagement. However, assuming for purposes of description that the frictional engagement is only sufficient to cause a degree of drag between the spool and the clutch plates that will prevent a back lash of the fishing line about the spool, it can be seen that further braking action may be accomplished by the lever arm 62. Referring again to FIGURES 1 and 2 it is seen that the projecting cam surfaces 82 are engaged upon inclined cam surface 64 at about the mid-point of the length of the cam surface. This position is equivalent to the lever arm 62 being rotated to a position approximating half of the distance about arcuate lever arm cam 90. As the lever arm 62 moves about lever arm cam 90 the lever arm will concurrently move in a radial direction since the lever arm cam is not centered about the center line axis of draw bar 52 and in fact the radial distance between the lever arm cam and the center line of the draw bar increases the radial extension of the lever arm as it moves in a clockwise manner. From FIGURE 2 it is seen that a radial extension of the lever arm will move the cam surfaces 82 and 64 into an increasing degree of engagement and such movement is reflected upon the draw bar 52 and moves draw bar 52 axially outwardly in the same manner as tightening thumb screw 87 in a clockwise manner. Therefore, a limited degree of drag may be applied to the spool 36 by means of the thumb screw 87 and then the fisherman may have complete control of full or partial braking action by finger tip control of the lever arm 62, however, after a partial drag has been set upon the reel the fisherman may also allow the spool to free wheel by rotating the lever arm 62 in a counter clockwise manner and allowing following pin 72 to engage the free spool notch 92 which allows the projecting cam surface 82 to ride downwardly and the inclined cam surface 64 to fall into relief notch 65. This relieves pressure upon draw bar 52 and permits spring 33 to react against clutch plate 29 and move it away from frictional surface 48 of the spool. Upon such a happening of frictional surfaces are then disengaged and the spool is in a free-wheel condition as in disclosed in FIGURE 4.

The above description shows that a new and improved fishing reel has been provided in which the braking surfaces are so mounted as to confine heat losses to the interior of the reel and prevent the heat from being transferred to the frame of the reel. Further, a new and novel combination thumb screw and lever actuating brake and clutch control has been described which positively adjusts the braking tension to a desired value and which may be precisely controlled with fingertip action.

While I have particularly shown and described one particular embodiment of the invention, it is distinctly understood that the invention is not limited thereto but that modifications may be made within the scope of the invention and such variations as are covered by the scope of the appended claims.

What is claimed is:

1. In a fishing reel having a fixed mounting frame, a central shaft journaled thereon, means operatively connected to the shaft to provide rotation thereof a flanged spool rotatably carried on the shaft having friction surfaces on the flanged ends, an improved brake for controlling rotation of the spool comprising, first and second clutch plates mounted upon the central shaft and being in non-rotating relation therewith, the clutch plates being so mounted upon the central shaft as to flank the spool, friction members fixedly secured to the clutch plates and adapted for engagement with the corresponding friction surfaces on the spool upon relative movement between the clutch plates and the spool, the first clutch plate being fixedly secured upon the central shaft, the second clutch plate being slidably mounted upon the central shaft, spring means located upon the central shaft and positioned between the clutch plates adapted to yieldingly urge the clutch plates out of frictional engagement with the spool, a cylindrical recess located along the longitudinal center line of the central shaft and opening at one end thereof for housing means to move the second clutch plate and the spool axially of the central shaft to engage the friction surfaces of the clutch plates and the spool so as to exert braking pressure upon the spool, the means including an elongated draw bar adapted to move in a reciprocative manner within the central shaft cylindrical recess, the draw bar being coupled at one end to the second clutch plate, the other end of the draw bar being threaded and extending exteriorly of the reel mounting frame, a thumb screw adapted to engage the threaded end of the draw bar, a flat lever arm mounted adjacent the frame and fulcrumed thereon, an elongated aperture in one end of the lever arm adapted to be positioned about the draw bar and a plurality of follower pins projecting from the other end toward the frame, an arcuate cam arm eccentrically mounted upon the frame and adapted to engage the follower pins, an inclined cam surface along the portion of the lever arm having the elongated aperture, cooperating cam means positioned to bear against the inclined cam surface, the thumb screw being so positioned to retain the cooperating cam means in intimate contact with the inclined cam surface to operatively couple the lever arm and draw bar, whereby when the lever arm is traveled along the arcuate cam arm the inclined cam surface operatively moves the draw bar axially to frictionally engage the clutch plates friction members against the spool friction members.

2. In a fishing reel having a fixed mounting frame, a central shaft journaled thereon, means operatively connected to the shaft to provide rotation thereof, a flanged spool rotatably carried on the shaft having friction surfaces on the flanged ends, an improved brake for controlling rotation of the spool comprising, first and second clutch plates mounted upon the central shaft and being in non-rotating relation therewith, the clutch plates being so mounted upon the central shaft as to flank the spool, friction members fixedly secured to the clutch plates and adapted for engagement with the corresponding friction surfaces on the spool upon relative movement between the clutch plates and the spool, the first clutch plate being fixedly secured upon the central shaft, the second clutch plate being slidably mounted upon the central shaft, spring means located upon the central shaft and positioned between the clutch plates adapted to yieldingly urge the clutch plates out of frictional engagement with the spool, a cylindrical recess located along the longitudinal center line of the central shaft and opening at one end thereof for housing means to move the second clutch plate and the spool axially of the central shaft to engage the friction surfaces of the clutch plates and the spool so as to exert braking pressure upon the spool, the means including an elongated draw bar adapted to move in a reciprocative manner within the central shaft cylindrical recess, the draw bar being coupled at one end to the second clutch plate, the other end of the draw bar being threaded and extending exteriorly of the reel mounting frame, a thumb screw adapted to engage the threaded end of the draw bar, a flat lever arm mounted adjacent the frame and fulcrumed thereon, an elongated aperture in one end of the lever arm adapted to be positioned about the draw bar and a plurality of follower pins projecting from the other end toward the frame, an arcuate cam arm eccentrically mounted upon the frame and adapted to engage the follower pins, an inclined cam surface along the portion of the lever arm having the elongated aperture cooperating cam means positioned to bear against the inclined cam surface, the thumb screw being so positioned to retain the cooperating cam means in intimate contact with the inclined cam surface to operatively couple the lever arm and draw bar, whereby when the thumb screw is tightened against the mounting frame the draw bar is axially moved to frictionally engage the clutch plates friction members against the spool friction members and the lever arm is adapted to change the degree of braking when it is traveled along the arcuate cam arm.

3. In a fishing reel having a fixed mounting frame, a central shaft journaled thereon, means operatively connected to the shaft to provide rotation thereof, a flanged spool rotatably carried on the shaft having friction suraces on the flanged ends, the spool friction surface being of ring shape and positioned concentrically about the axis of the spool, an improved brake for controlling rotation of the spool comprising, first and second clutch plates mounted upon the central shaft and being in non-rotating relation therewith, the clutch plates being so mounted upon the central shaft as to flank the spool, friction members fixedly secured to the clutch plates and adapted for engagement with the corresponding friction surfaces on the spool upon relative movement between the clutch plates and the spool, the clutch plate friction members being of ring shape and positioned concentrically about the axis of the clutch plates, the first and second clutch plates having perpendicularly inwardly extending bearing surfaces, the spool rotatably supported upon the bearing surfaces of the clutch plates, the first clutch plate being fixedly secured upon the central shaft, the second clutch plate being slidably mounted upon the central shaft, spring means located upon the central shaft and positioned between the clutch plates adapted to yieldingly urge the clutch plates out of frictional engagement with the spool, a cylindrical recess located along the longitudinal center line of the central shaft and opening at one end thereof for housing means to move the second clutch plate and the spool axially of the central shaft to engage the friction surfaces of the clutch plates and the spool so as to exert braking pressure upon the spool, the means including an elongated draw bar adapted to move in a reciprocative manner within the central shaft cylindrical recess, the draw bar being coupled at one end to the second clutch plate, the other end of the draw bar being threaded and extending exteriorly of the reel mounting frame, a thumb screw adapted to engage the threaded end of the draw bar, a flat lever arm mounted adjacent the frame and fulcrumed thereon, an elongated aperture in one end of the lever arm adapted to be positioned about the draw bar and a plurality of follower pins projecting from the other end toward the frame, an arcuate cam arm eccentrically mounted upon the frame and adapted to engage the follower pins, an inclined cam surface along the portion of the lever arm having the elongated aperture, cooperating cam means positioned to bear against the inclined cam surface, the thumb screw being so positioned to retain the cooperating cam means in intimate contact with the inclined cam surface to operatively couple the lever arm and draw bar, whereby when the thumb screw is tightened against the mounting frame the draw bar is axially moved to frictionally engage the clutch plates friction members against the spool friction members and the lever arm is adapted to change the degree of braking when it is traveled along the arcuate cam arm.

References Cited by the Examiner
UNITED STATES PATENTS

| | | | |
|---|---|---|---|
| 1,547,238 | 7/1925 | Russell et al. | 242—84 |
| 2,209,598 | 7/1940 | Coxe | 242—84 |
| 2,298,481 | 10/1942 | Hayes | 242—84 |
| 3,104,075 | 9/1963 | Wood | 242—84 |

FRANK J. COHEN, *Primary Examiner.*

BILLY S. TAYLOR, *Examiner.*